United States Patent [19]
Kikuchi

[11] Patent Number: 5,355,997
[45] Date of Patent: Oct. 18, 1994

[54] STORAGE CASE FOR DISC-SHAPED RECORDING MEDIA

[75] Inventor: Shuichi Kikuchi, Miyagi, Japan

[73] Assignee: Sony Corporation, Tokyo, Japan

[21] Appl. No.: 157,368

[22] Filed: Nov. 23, 1993

[30] Foreign Application Priority Data

Nov. 25, 1992 [JP] Japan .................................. 4-336747

[51] Int. Cl.⁵ .............................................. B65D 79/00
[52] U.S. Cl. .................................. 206/45.13; 206/444
[58] Field of Search ................... 206/45.13, 45.18, 444

[56] References Cited

U.S. PATENT DOCUMENTS

| | | | |
|---|---|---|---|
| 4,356,918 | 11/1982 | Kahle et al. | 206/444 |
| 4,634,001 | 1/1987 | Wakelin | 206/444 X |
| 4,655,342 | 4/1987 | Brauner et al. | 206/444 X |
| 4,660,719 | 4/1987 | Peterson et al. | 206/45.13 X |
| 4,676,375 | 6/1987 | Willems et al. | 206/45.13 X |
| 4,693,364 | 9/1987 | Wakelin | 206/45.18 |
| 4,766,999 | 8/1988 | Kin-Shon | 206/45.13 |
| 4,801,004 | 1/1989 | Egly et al. | 206/45.13 |
| 4,934,530 | 6/1990 | Riess | 206/45.13 |

Primary Examiner—William I. Price
Attorney, Agent, or Firm—Lewis H. Eslinger; Jay H. Maioli

[57] ABSTRACT

To facilitate the handling and retrieving a cassette from among a large numbers of such cassettes contained in a case a pair of right and left inner boxes are arranged in the right and left length direction of an outer box. The inner boxes are rotatably mounted on the inner side of the outer box, so as to rotate independently. The inner boxes are identical to each other to minimize manufacturing and assembly costs.

7 Claims, 13 Drawing Sheets

STORAGE CASE FOR DISC-SHAPED RECORDING MEDIA

BACKGROUND OF THE INVENTION

1. Field of the Invention

The present invention relates generally to a cassette case for containing several tens of disk cassettes or the like each containing, for example, a 3.5 inch floppy disk and, more specifically, to a cassette case that has individual compartments containing a number of cassettes.

2. Description of the Background

There has been proposed a cassette containing case as shown in FIGS. 9 to 13 that can store several tens of disk cassettes, each containing a 3.5 inch floppy disk. That cassette containing case is made of a plastic resin and includes a cover box 1, which serves as a pedestal when opened, an outer box 2, and an inner box 3. The cover box 1 has right and left side plates 11, a top plate 12, and a front surface plate 13, which has a height about one-half that of the right and left side plates 11 and is arranged contiguously with the top plate 12. The cover box thus formed provides at least two open areas 14 and 16. The outer box 2 has right and left side plates 21, a back surface plate 22, and a bottom plate 23. The outer box thus formed defines a main open area 24. The inner box 3 includes right and left side plates 31, a front surface plate 32, and a central partitioning plate 33. The inner box 3 is formed to have a height around one-half that of the outer box 2.

In assembling such a plastic case, the outer box 2 is inserted within the cover box 1, and the portions near the lower ends of the right and left side plates 21 of the outer box 2 are rotatably mounted on the inner sides of the lower ends of the right and left side plates 11 by a pair of right and left supporting pins 4 formed integrally with the right and left side plates 11. The inner box 3 is inserted within the outer box 2, and the lower end of the front surface plate 32 of the inner box 3 is rotatably mounted on the leading edge of the bottom plate 23 of the outer box 2 by means of a hinge 5. In addition, a pair of right and left guide pins 6 and corresponding arcuate slots 7 for restricting the extent of rotation of the inner box 3 are formed between the right and left side plates 21 of the outer box 2 and the right and left side plates 31 of the inner box 3 in such a manner as to be freely fitted to each other.

The cassette case can be assembled and closed to form a perfect closed box, as shown in FIG. 9. In that position, the front surface plate 32 of the inner box 3 is fitted to the opening 16 of the cover box 1, and the cover box 1 is locked to the outer box 2 at a locking portion (not shown).

In such an assembled closed state as shown in FIG. 9, a locking releasing portion 8 is depressed to release the locking between the cover box 1 and the outer box 2. After that, as shown in FIG. 10, the cover box 1 is rotated by 90 degrees around the supporting pins 4 in the direction of arrow a, to an opened position. Subsequently, as shown in FIGS. 11 and 12, the cover box 1 is rotated further by about 200 degrees around the supporting pins 4 in the direction of the arrow a, to reverse the direction of the cover box 1 relative to FIGS. 10 and 11. The outer box 2 is thus relatively inserted in the open area 16 of the cover box 1, and the back surface plate 22 of the outer box 2 is abutted on the front surface plate 13 of the cover box 1. Consequently, the outer box 2 is stably supported on the cover box 1, with the cover box 1 serving as pedestal, and with the outer box in an attitude inclined backward in the direction of the arrow c'. This kind of cassette containing case is intended to be placed on the top of a desk or similar surface.

As shown in FIG. 11, ten to fifteen disk cassettes 9, each containing a 3.5 inch floppy disk, can be inserted in each of a pair of right and left cassette containing portions 10a and 10b formed respectively on both sides of the central partitioning plate 33 between the outer box 2 and the inner box 3 along the direction of arrow b.

In retrieving and taking out a disk cassette 9 contained in either of the right and left cassette containing portions 10a and 10b, the inner box 3 is rotated around the hinge 5 forward in the direction of the arrow c with respect to the outer box 2, and is opened in an approximately inverted trapezoid shape with respect to the outer box 2, as shown by the broken line in FIG. 12 and also in FIG. 13. In that position, the guide pins 6 and the arcuate slots 7 cooperate to restrict the extent of rotation of the inner box 3 in the direction of the arrow c.

While this proposed arrangement appears to provide a serviceable unit, the pair of right and left cassette containing portions 10a and 10b being integrally formed on the right and left sides of the central partitioning plate 33 of the inner box 3 brings about the following disadvantage. Namely, in retrieving and taking out a required cassette 9 in the state that a large number of cassettes 9 are stored in the right and left containing portions 10a and 10b, as shown in FIGS. 12 and 13, as soon as the inner box 3 is opened forward in the direction of the arrow c with respect to the outer box 2, many of the cassettes 9 will fall forward in the direction of arrow c. This causes the gravity centers of the outer box 2 and the inner box 3 to be displaced making the assembly unstable. As a result, the outer box 2 and the inner box 3 tend to occasionally fall forward around the right and left supporting pins 4 in the direction of the arrow c with respect to the cover box 1.

Further, as shown in FIG. 13, when the inner box 3 is opened in the direction of the arrow c with respect to the outer box 2, large numbers of the disk cassettes 9 contained in the right and left cassette containing portions 10a and 10b will both fall forward in the direction of arrow c. Consequently, when the disk cassette 9 within one cassette containing portion 10a is retrieved and taken out, it is obstructed by the disk cassettes 9 within the other cassette containing portion 10b. Thus, there occurs the disadvantage such that the cassette 9 is difficult to handle when it is retrieved and taken out in the case that there are large numbers of cassettes contained in the opened cassette case.

OBJECTS AND SUMMARY OF THE INVENTION

Accordingly, it is an object of the present invention to provide a cassette case that can eliminate the above-noted defects inherent in the previously proposed case.

To solve the above problems the present invention has been made and a further object of the present invention is to provide a cassette containing case capable of facilitating the handling of the cassette when it is retrieved and then taken out in the case where there are large numbers of cassettes contained in the case.

According to one aspect of the present invention, there is provided a cassette containing case including a cover box serving as a pedestal, an outer box rotatably mounted on the inner sides of the cover box, and a pair of right and left identical inner boxes, which are arranged side-by-side along the right and left length direction of the outer box, and which are independently rotatably mounted on the inner side of the outer box.

In this case, preferably, the heights of supporting pins of a pair of the right and left inner boxes are made similar to each other, and a pair of right and left guide pins for restricting the rotational angle of a pair of the right and left inner boxes and a pair of right and left arcuate slots of the outer box, to which the above guide pins are freely fitted, are respectively made different in height from each other, whereby a pair of the right and left inner boxes are so constructed to be similar in shape to each other. Further, a pair of supporting pins provided on the inner sides of a pair of the right and left inner boxes so as to be opposed to each other are fitted in one fitting hole formed on a central partitioning plate of the outer box from the right and left sides in an inside/outside structure.

In the cassette containing case of the present invention having the above construction, there are two identical inner boxes arranged in the right and left length direction of the outer box, and the pair of the right and left inner boxes are independently rotatably mounted on the inner side of the outer box. With this construction, even when large numbers of disk cassettes or the like are contained in the pair of the right and left inner boxes, the right and left inner boxes can be independently opened and the center of gravity of the entire assembly is not adversely dislocated.

The manner in which the above and other objects, features, and advantages are achieved by the present invention will become apparent from the following detailed description of illustrative embodiments thereof, to be read in conjunction with the accompanying drawings.

DETAILED DESCRIPTION OF PREFERRED EMBODIMENTS

Figure 1:
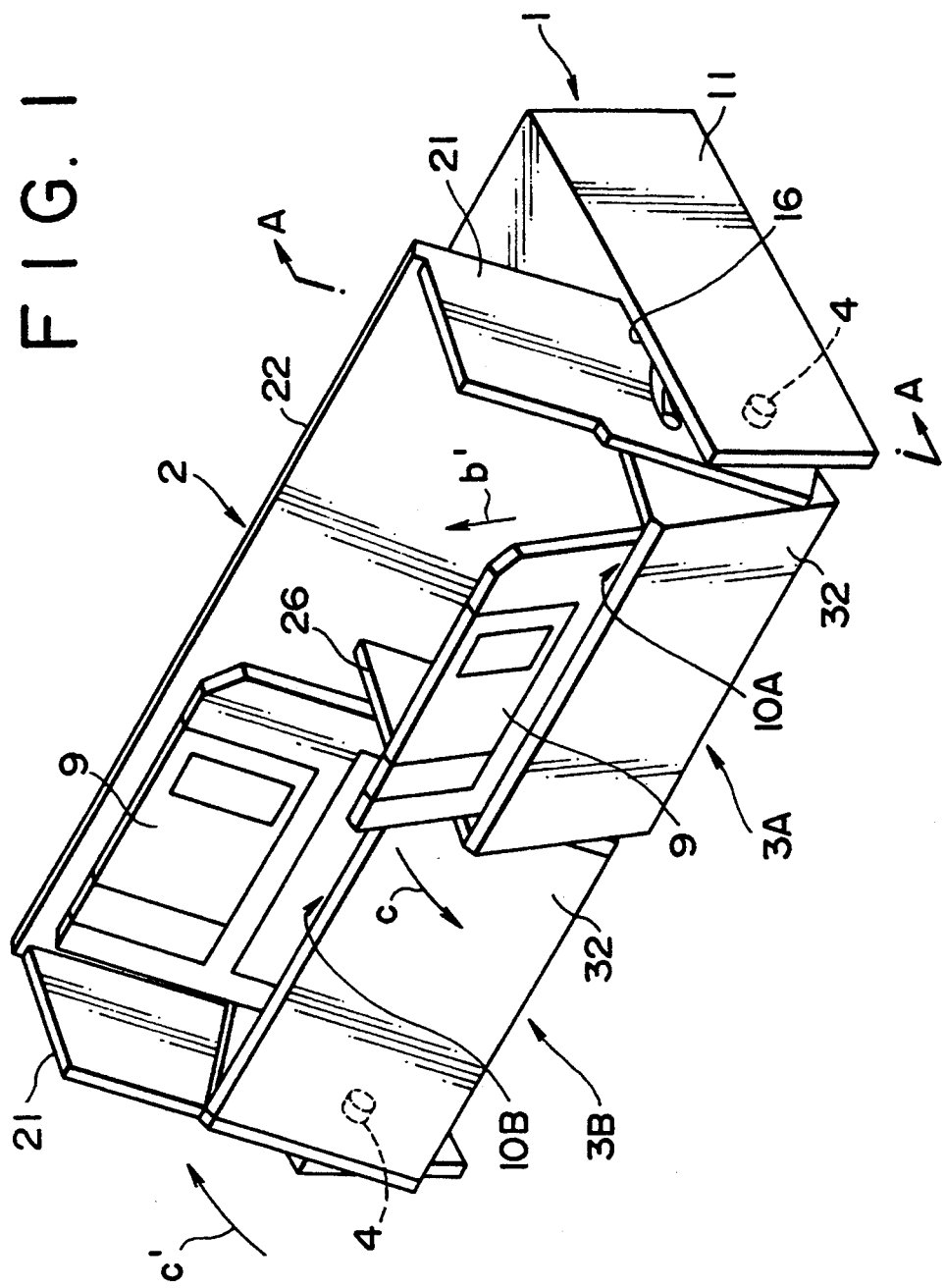
FIG. 1 is a perspective view useful in explaining retrieving a disk cassette from a cassette containing case according to one embodiment of the present invention.

Hereinafter, one embodiment of a cassette containing case by means of which the present invention is practiced will be described with reference to FIGS. 1 to 8, in which the same parts as those in FIGS. 9 to 13 are indicated by the same reference numerals and further explanation thereof is omitted.

Figure 2:
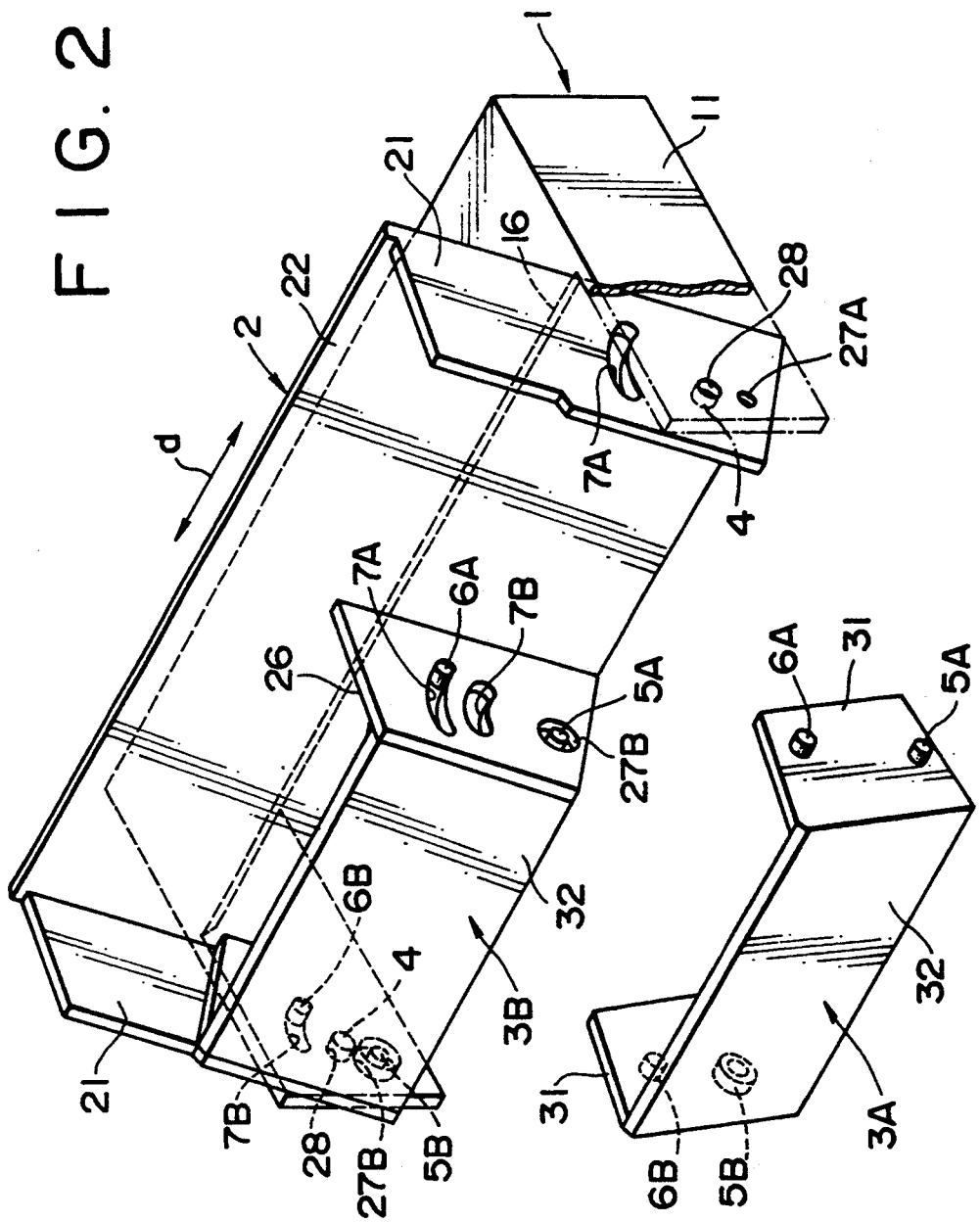
FIG. 2 is an exploded view in perspective of the cassette containing case of FIG. 1.
Figure 3:
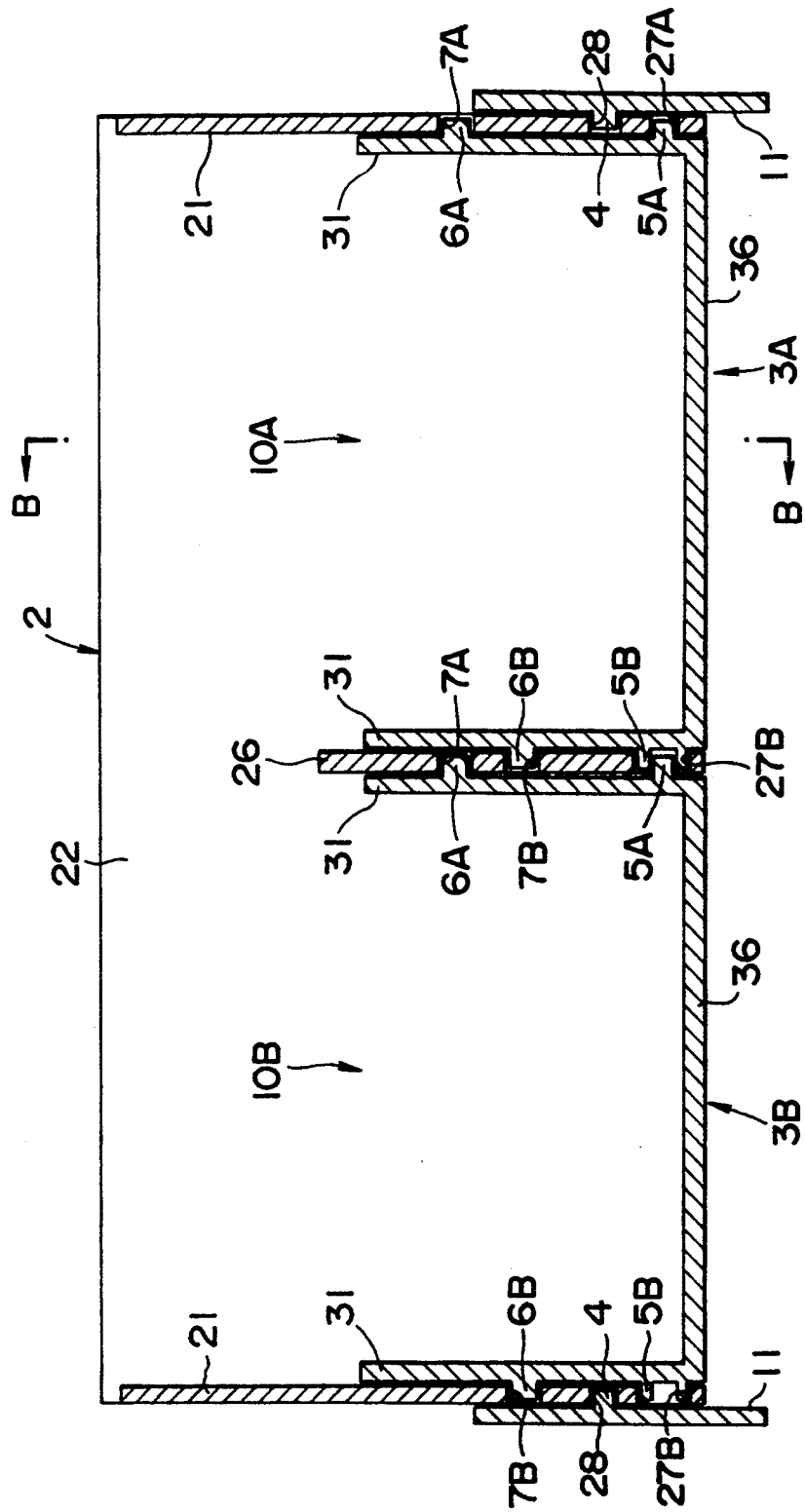
FIG. 3 is a sectional view taken along section line A—A of FIG. 1.

In this embodiment the cassette containing case includes a pair of the right and left inner boxes 3A and 3B, which provide two compartments in the right and left length direction, as shown by arrow d in FIG. 2, contained in an outer box 2. The right and left inner boxes 3A and 3B have the same shape and are identical, which is a feature of this invention. The inner boxes can be advantageously formed of a plastic resin.

In each of the right and left inner boxes 3A and 3B, right and left side plates 31, a front surface plate 32 and a bottom surface 36 are respectively integrally formed. A small diameter supporting pin 5A and a cylindrical supporting pin 5B are integrally formed on the lower or bottom ends of the right and left side plates 31 so as to be coaxial with each other. The cylindrical supporting pin 5B is an upraised ring that has an inner diameter larger than the outer diameter of the pin 5A. A pair of guide pins 6A and 6B are integrally formed on the upper ends of both sides of the right and left side plates 31 but at distances from pins 5A, 5B that are different. That is, unlike pins 5A and 5B, pins 6A and 6B are not coaxial.

A central partitioning plate 26 is integrally formed on the inner side of the back surface plate 22 of the outer box 2. Here, a bottom surface for the outer box 2 which would be conventionally provided, is not provided. A small diameter pin fitting hole 27A having a diameter corresponding to the diameter of the supporting pin 5A is formed on the lower end of the right side plate 21 in FIG. 2. Large diameter pin fitting holes 27B having a diameter corresponding to the diameter of the cylindrical or ring-shaped supporting pin 5B are formed on the lower end of the left side plate 21 and in the central partitioning plate 26. A pair of right and left arcuate slots 7A and 7B are formed in the central positioning plate 26 at different heights from the bottom edge of the plate and to which a pair of right and left guide pins 6A and 6B of the right and left inner boxes 3A and 3B are freely fitted. Further, a pair of the right and left pin fitting holes 28, to which a pair of right and left pins 4 coaxially formed integrally on the inner sides of the right and left side plates 11 of the cover box 1, are formed in the vicinity of the lower ends of the right and left side plates 21 of the outer box 2.

As shown in FIGS. 2 to 5, the outer box 2 is inserted between the right and left side plates 11 of the cover box 1, and the right and left supporting pins 4 are fitted in the right and left pin fitting holes 28. Accordingly, the outer box 2 is rotatably mounted on the cover box 1 around the right and left supporting pins 4.

Next, the right and left inner boxes 3A and 3B are inserted between the right and left side plates 21 and the central partitioning plate 26. Thus, a pair of the right and left supporting pins 5A and 5B are respectively fitted to a pair of the right and left pin fitting holes 27A and 27B, and the guide pins 6A and 6B are respectively freely fitted in the arcuate slots 7A and 7B.

Figure 4:
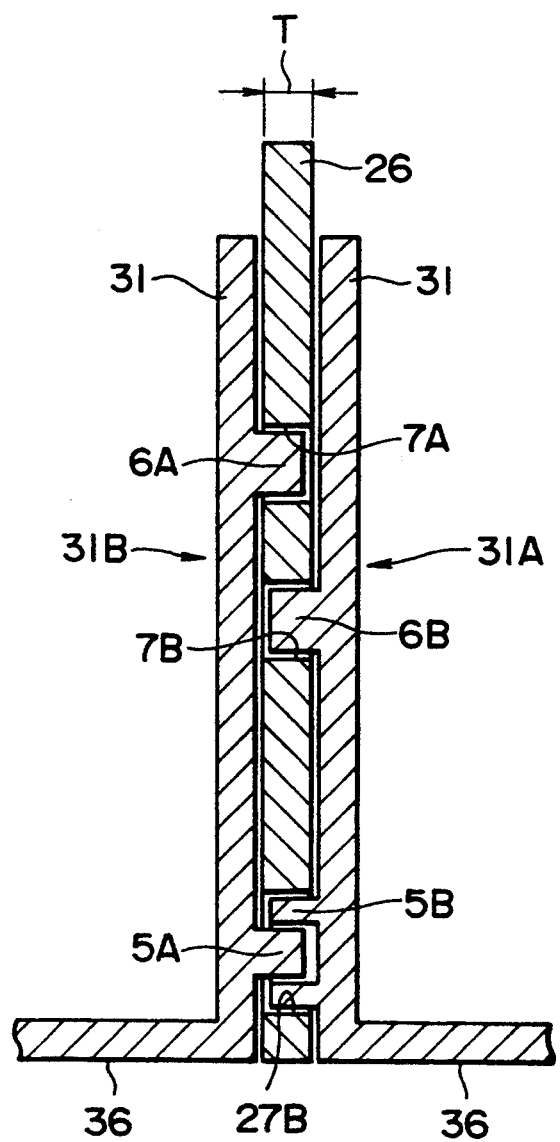
FIG. 4 is an enlarged sectional view of the central partitioning plate of FIG. 3.

In this case, as shown in FIG. 4, at the central partitioning plate 26, the cylindrical supporting pin 5B of one inner box 3A is fitted in one large diameter pin fitting hole 27A, and the supporting pin 5A of the other inner box 3B is fitted in the supporting pin 5B.

Accordingly, as shown in FIGS. 1 to 5, the right and left inner boxes 3A and 3B are rotatably mounted on the outer box 2 around a pair of the right and left supporting pins 5A and 5B so as to rotate independently of each other. Thus, a pair of right and left cassette containing portions 10A and 10B are independently formed between the outer box 2 and the right and left inner boxes 3A and 3B.

As described above, the right and left supporting pins 5A and 5B formed on the inner sides of the right and left inner boxes 3A and 3B are fitted in one pin fitting hole of the central partitioning plate 26 from the right and left sides. Further, a pair of the right and left guide pins 6A and 6B different in height from each other from the bottom edge of the inner sides of the right and left inner boxes 3A and 3B are freely fitted in a pair of arcuate slots 7A and 7B different in height from each other from the bottom edge of the central partitioning plate 26 from the right and left sides. Accordingly, as shown in FIG. 4, it is possible to hold the thickness T of the central partitioning plate 26 at a minimum.

Figure 6:
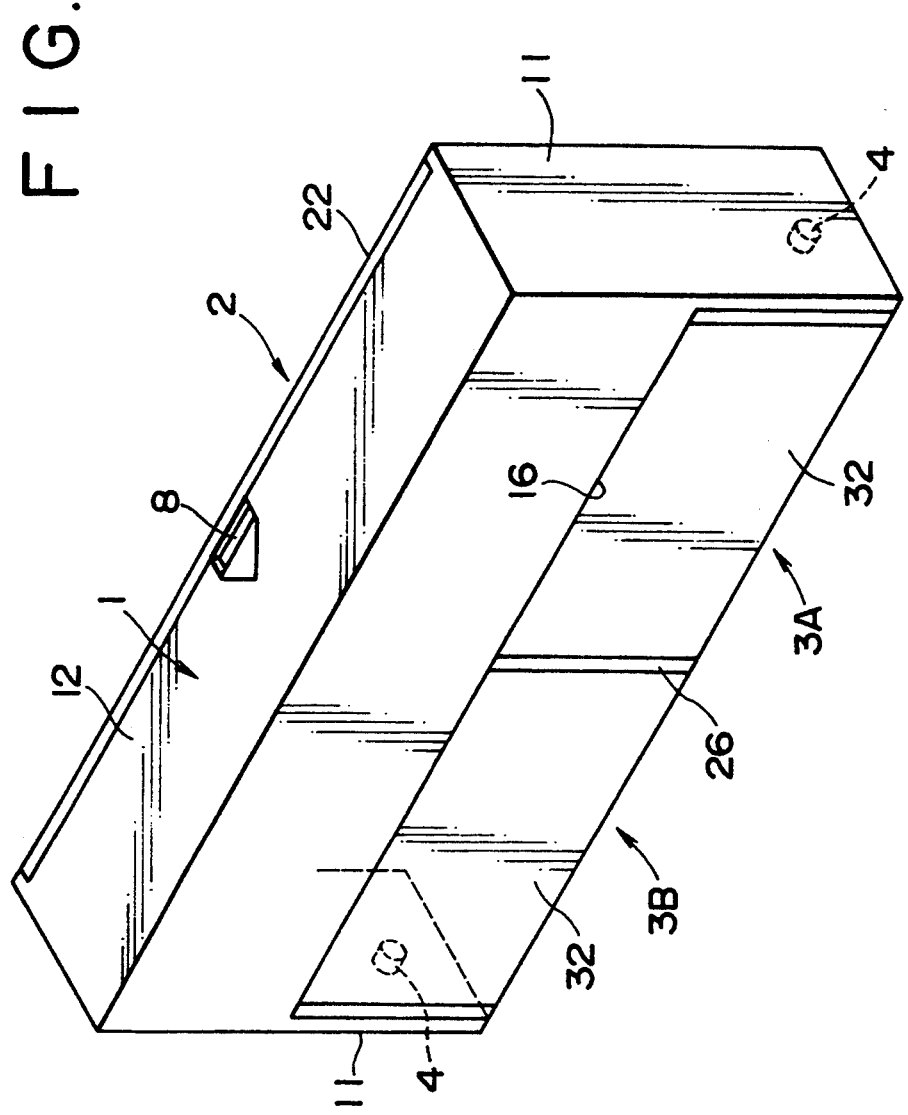
FIG. 6 is a perspective view showing the cassette containing case assembled into a perfect box-type form according to an embodiment of the present invention.

The usage of the cassette containing case having the above construction is described below. First, the cassette containing case can be assembled to form a rectangular box as shown in FIG. 6, just as in the previously proposed one. At this time, a pair of the right and left front surface plates 32 of the right and left inner boxes 3A and 3B are fitted in the opening 16 of the cover box 32, and the cover box 1 and the outer box 2 are locked using a suitable locking portion (not shown).

Figure 5:
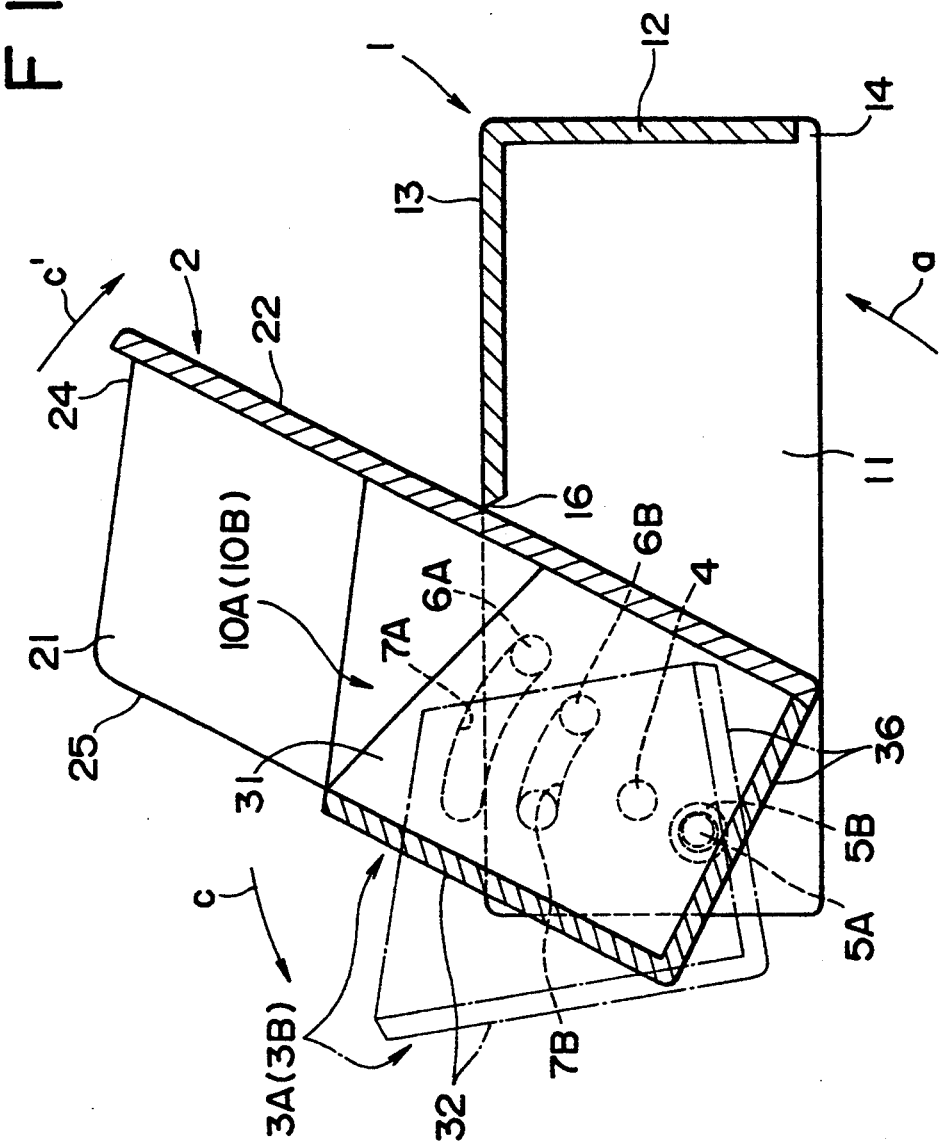
FIG. 5 is a sectional view taken along section line B—B of FIG. 3.
Figure 7:
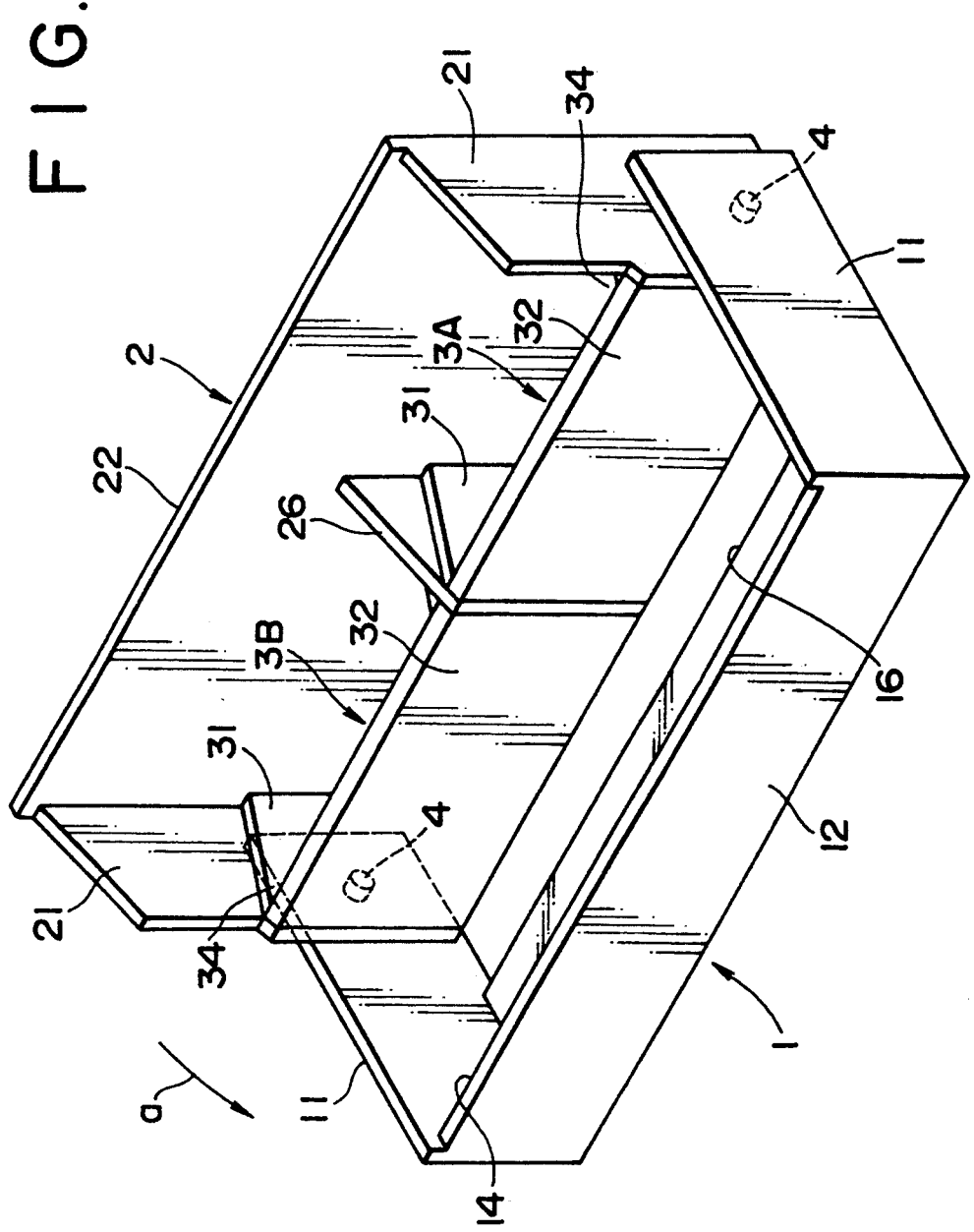
FIG. 7 is a perspective view of the box of FIG. 6 with the cover box opened and rotated by 90 degrees.
Figure 8:
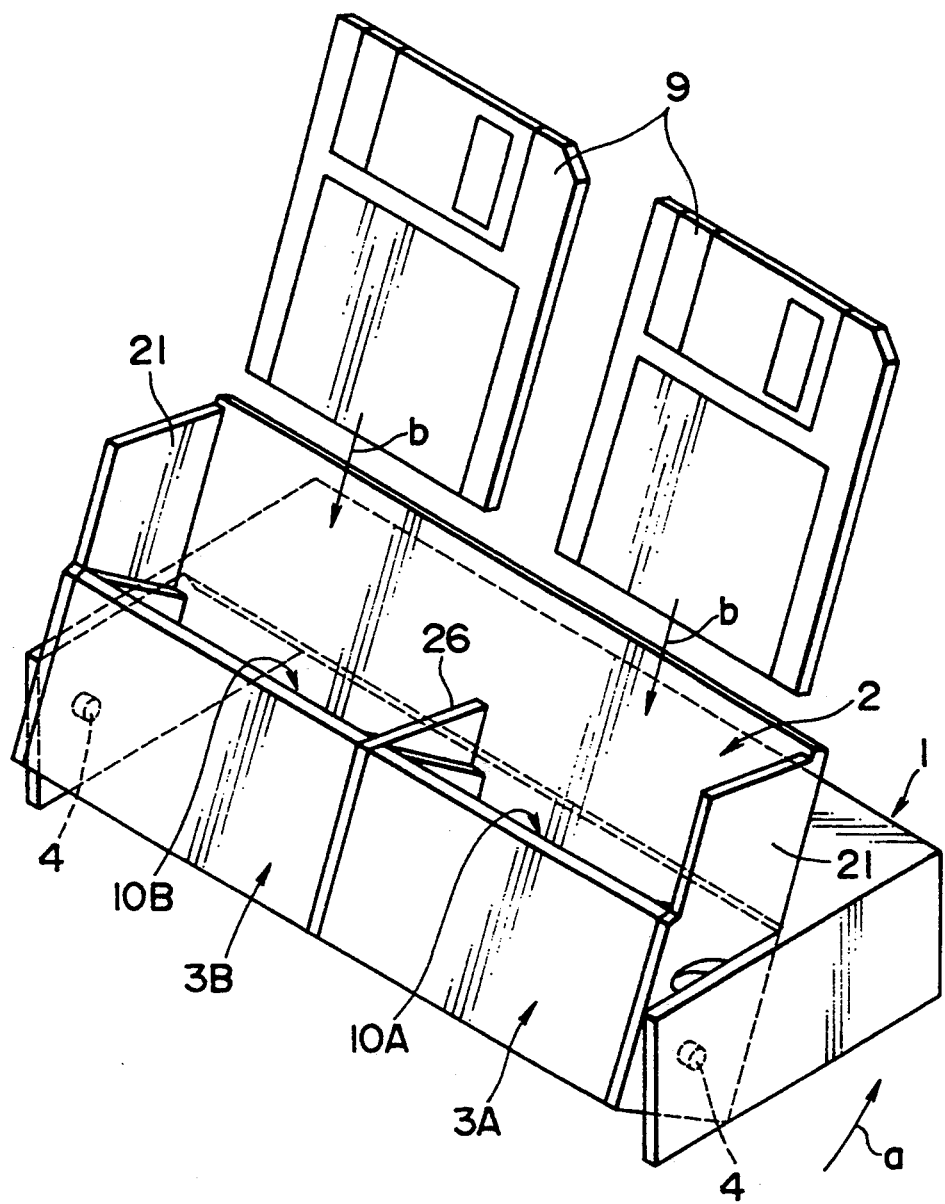
FIG. 8 is a perspective view of the box of FIG. 7 with the cover box further rotated by about 200 degrees so as to function as a pedestal.
Figure 9:
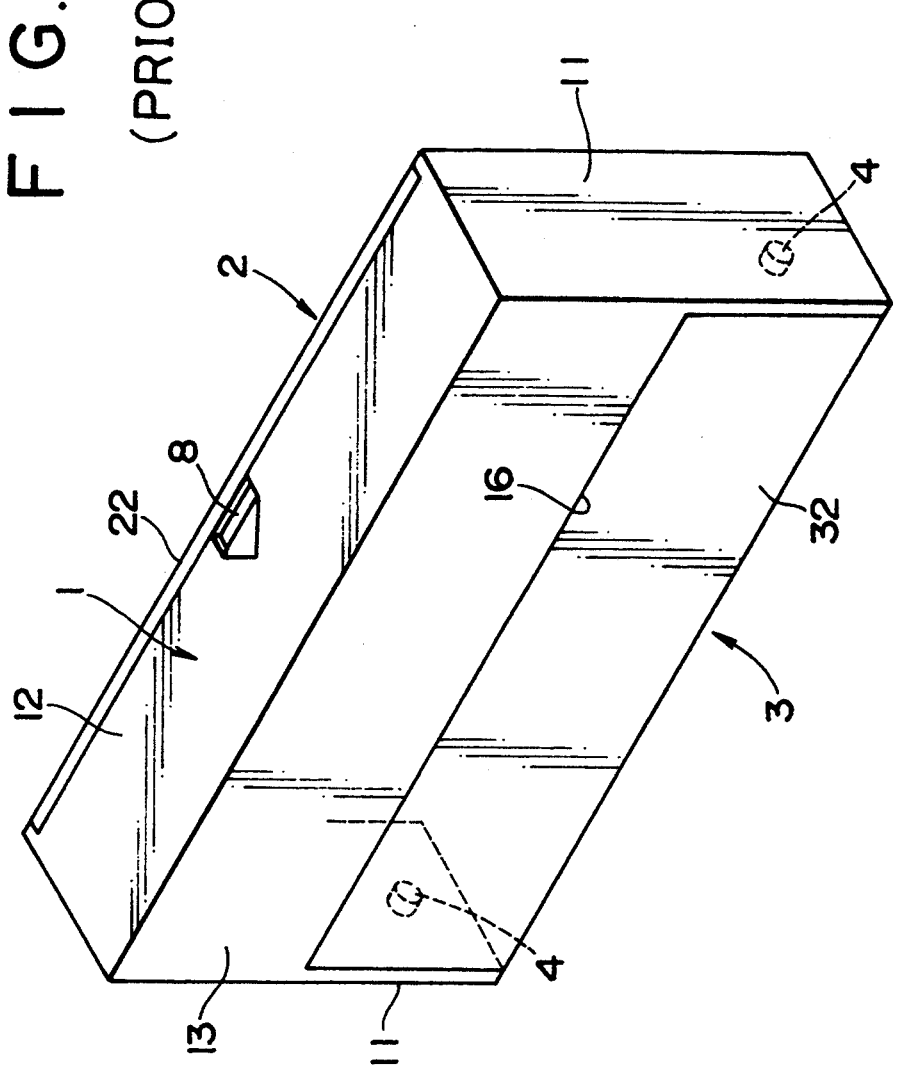
FIG. 9 is a perspective view showing the assembled state of a previously proposed cassette containing case in the form of a box.
Figure 10:
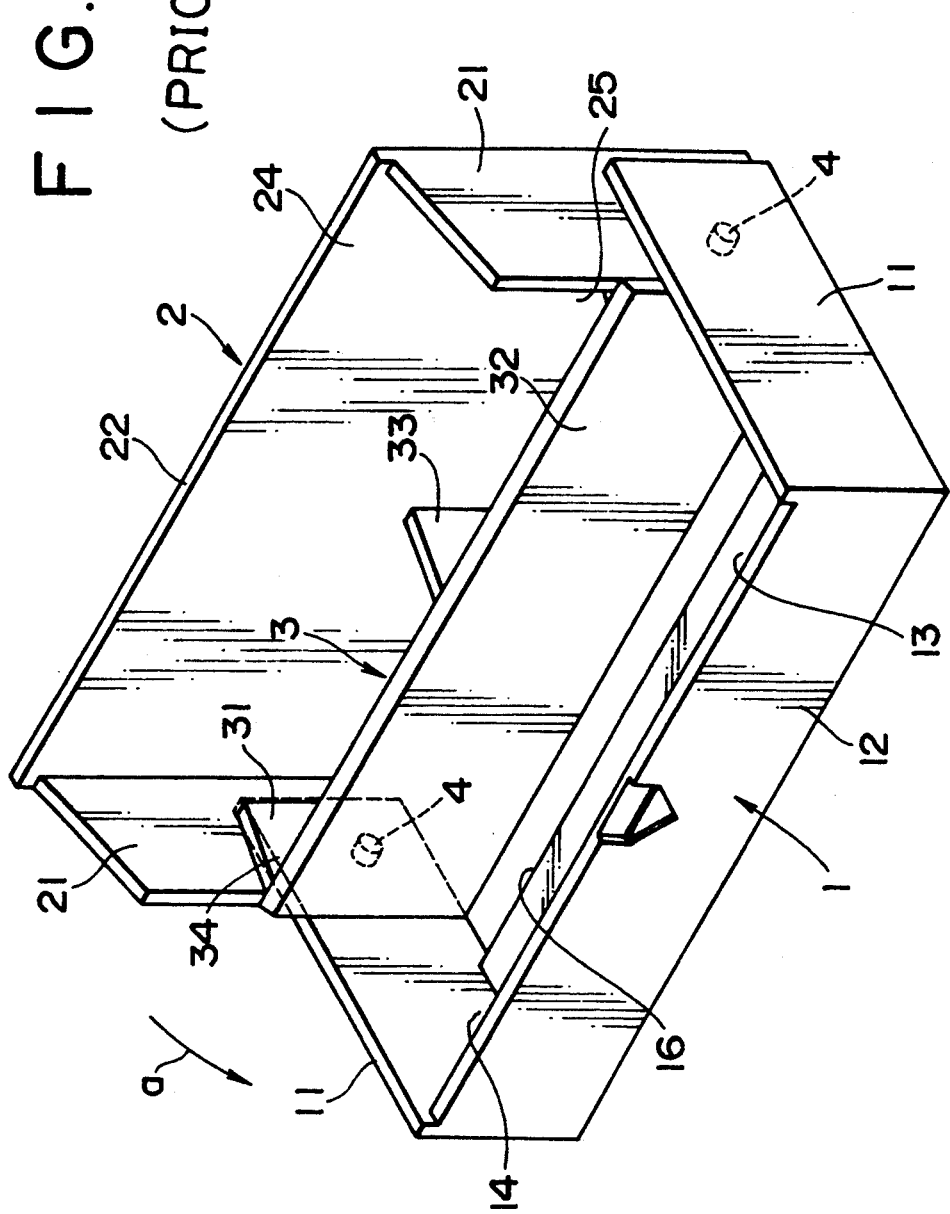
FIG. 10 is a perspective view of the box of FIG. 9 with the cover box opened by 90 degrees.
Figure 11:
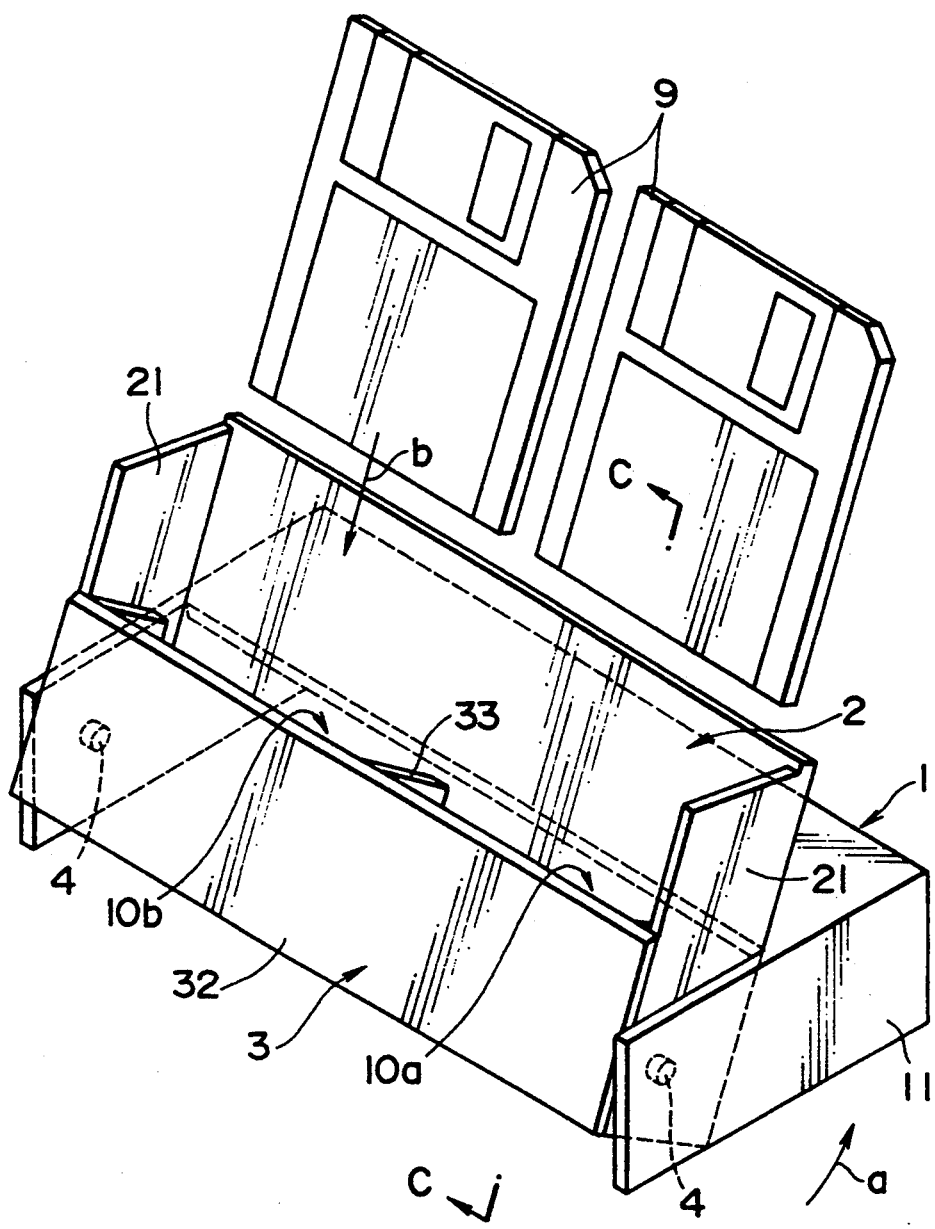
FIG. 11 is a perspective view of the box of FIG. 10 with the cover box further rotated by about 200 degrees to function as a pedestal.
Figure 12:
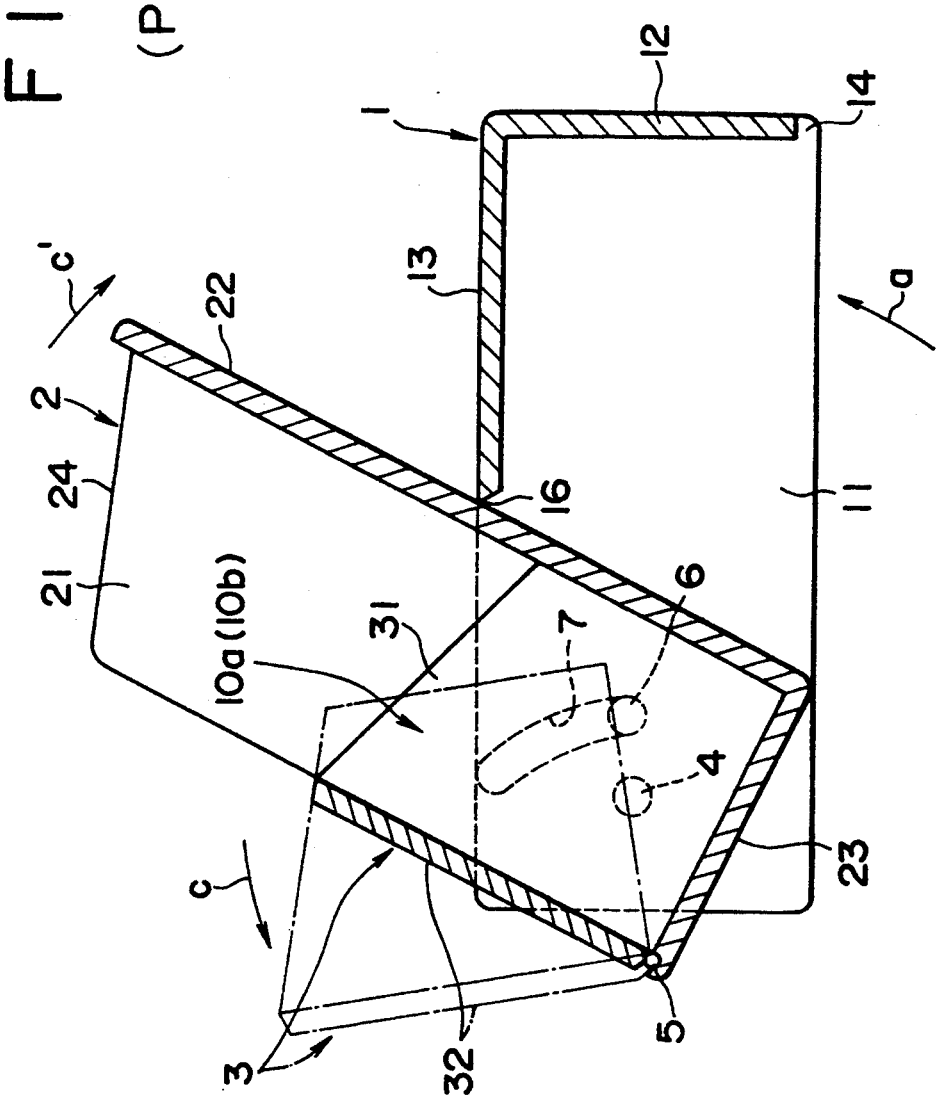
FIG. 12 is a sectional view taken along section line C—C of FIG. 11.
Figure 13:
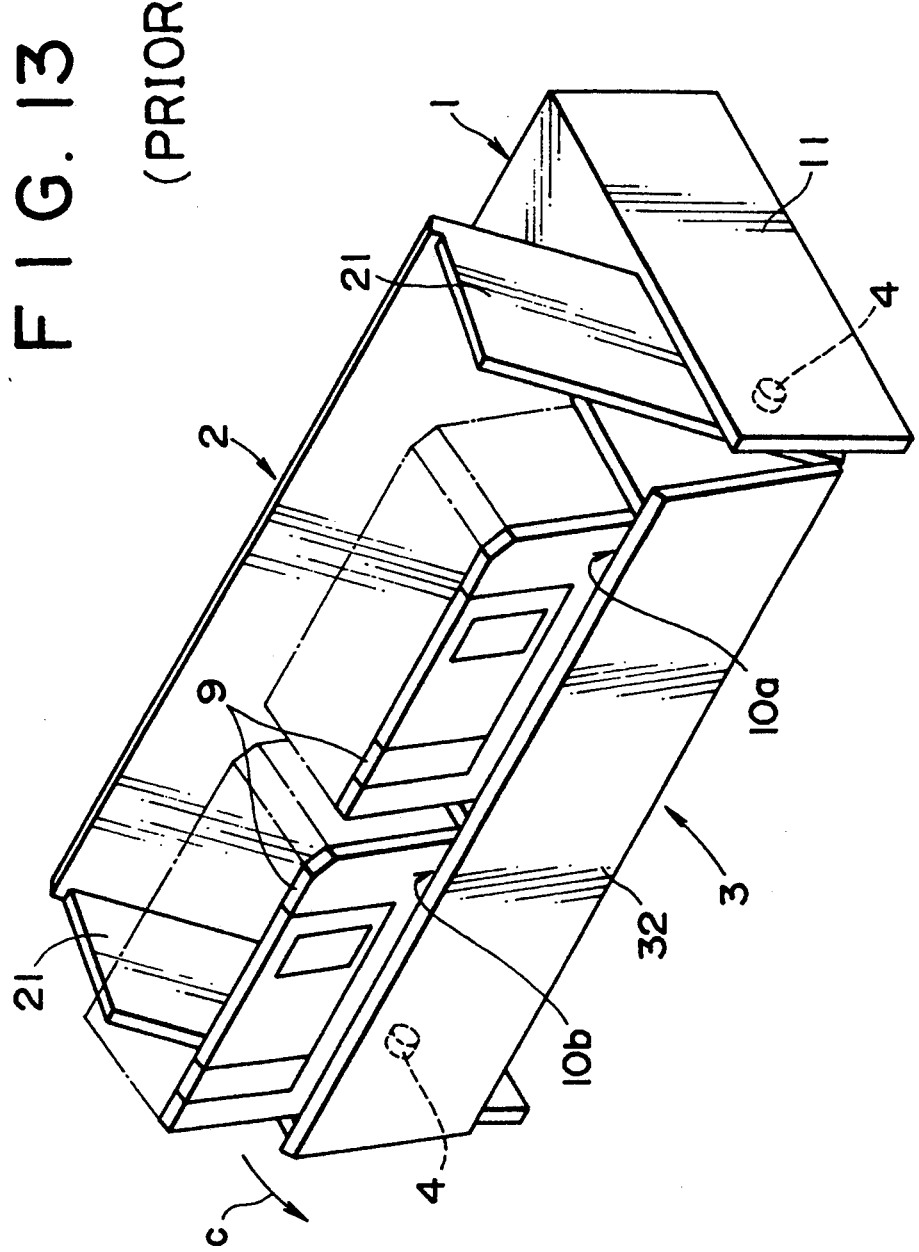
FIG. 13 is a perspective view of the cassette case of FIG. 9 with disc cassettes inserted therein.

In the state shown in FIG. 6, a locking releasing portion 8 is depressed to release the locking between the cover box 1 and the outer box 2. After that, as shown in FIG. 7, the cover box 1 is rotated by 90 degrees around the supporting pins 4 in the direction of the arrow a with respect to the cover box 1, thereby opening the case. Subsequently, as shown in FIGS. 5 and 8, the cover box is rotated further by 200 degrees around the supporting pins 4 in the direction of the arrow a with respect to the cover box 1, to vertically reverse the direction of the cover box 1. As a result, the outer box 2 is relatively inserted in the opening 16 of the cover box 1, and the back surface plate 22 is abutted on the front surface plate 13 of the cover box 1. Thus, the outer box 2 is stably supported with the cover box 1 serving as the pedestal so as to be inclined backward in the direction of the arrow c'.

As shown in FIG. 8, from ten to fifteen disk cassettes 9 each containing a 3.5 inch floppy disk are inserted in each of the pair of right and left independent cassette containing portions 10A and 10B along the direction of the arrow b, to be thus contained therein.

In this cassette containing case, it is possible to independently and easily retrieve and take out large numbers of disk cassettes 9 contained in the right and left cassette containing portions 10A and 10B.

Namely, as shown by the broken lines in FIG. 5 and in FIG. 1, in retrieving and taking out the disk cassette 9 within one cassette containing portion 10A, only one inner box 3A is rotated around the right and left supporting pins 5A and 5B forward in the direction of arrow c, to be thus opened, and the disk cassette 9 within the inner box 3A is inclined in the direction of the arrow c. At this time, the rotational angle of the inner box 3A in the direction of the arrow c is restricted by the right and left guide pins 6A and 6B and the arcuate slots 7A and 7B.

Then, since the other inner box 3B is held in such an attitude as to be inclined backward in the direction of the arrow c', the disk cassette 9 within the other cassette containing portion 10B remain inclined in the direction of arrow c'.

Accordingly, there is no fear that large numbers of the disk cassettes 9 contained in the right and left cassette containing portions 10A and 10B forward in the direction of arrow c, so that the outer box 2 and the inner boxes 3A and 3B could fall in the direction of arrow c with respect to the cover box 1.

Further, only the disk cassette 9 within one cassette containing portion 10A can be inclined forward in the direction of the arrow c, while large numbers of the disk cassettes 9 within the other cassette containing portion 10B are inclined backward in the direction of the arrow c'. Accordingly, when the disk cassette 9 within one cassette containing portion 10A is retrieved and taken out, it is not obstructed by the disk cassette 9 within the other cassette containing portion 10B. This makes it possible to easily retrieve and take out the selected cassette 9.

In addition, in retrieving and taking out the disk cassette 9 within the other cassette containing portion 10B, while the one inner box 3A is inclined in the direction of the arrow c', only the other inner box 3B is rotated in the direction of the arrow c, to be thus opened.

According to the above cassette containing case, since the pair of right and left inner boxes 3A and 3B has the same shape, it is possible to easily form and assemble the inner boxes 3A and 3B. Further, the thickness T of the central partitioning plate 26 of the outer box 2 can be minimized, and consequently, despite the two inner boxes 3A and 3B it is possible to form the whole cassette containing case with compactness, and yet contain large numbers of disk cassettes 9. In addition, the pair of the right and left inner boxes 3A and 3B can be formed in two colors, so as to make the cassette containing case colorful.

Although one embodiment of the present invention has been described, the present invention is not limited thereto, and various modification is possible on the basis of the technical thought of the present invention.

The cassette containing case of the present invention is not limited to the containing case for disk cassettes, and may be applied to the containing case for various cassettes containing various recording media.

What is claimed is:

1. A cassette case for containing a plurality of cassettes comprising:
    a cover box having a front surface plate and right and left side plates each extending orthogonally from said front surface plate in a same direction;
    an outer box having at least a back surface plate and a pair of side plates extending orthogonally from said back surface plate, and rotatably connected to said cover box between a first, closed position, in which a box type assembly is formed by said cover box and said outer box and a second, opened position, in which said back surface plate is abutted on the front surface plate of said cover box;
    a plurality of inner boxes each rotatably mounted for forming rooms to accommodate the plurality of cassettes; and means for providing independent rotational movement between said inner boxes relative to said outer box.

2. The cassette case according to claim 1, wherein said means for providing independent rotational movement comprises at least one partitioning plate extending substantially parallel to said side plates from said back surface plate of said outer box, so that a space defined by said back surface plate and said pair of side plates is divided into a plurality of subspaces each for accommodating one of said plurality of inner boxes.

3. The cassette case according to claim 2, wherein each said inner box has a front surface plate, and right and left side plates each extending orthogonally from said front surface plate, in which said means for providing independent rotational movement comprises an arcuate slot formed in each said side plate of said outer box and in said partitioning plate, a center position of which corresponds to a position of a supporting pin formed in each said side wall of each inner box, for guiding a rotation of itself relative to said outer box, wherein said first distance between said supporting pin and said arcuate slot of one of said pair of side plates is different from a second distance between the same of the other side plates, said right side plate of said outer box has a pin fitting hole rotatably receiving the supporting pin of the right side plate of said inner box, and an arcuate slot located at a position said first distance away from said pin fitting hole, said left side plate of said outer box has a pin fitting hole rotatably receiving the supporting pin of the left side plate of said inner box, and an arcuate slot located at a position said second distance away from said pin fitting hole, and said partitioning plate has a pin fitting hole rotatably receiving said supporting pin and first and second arcuate slots each located at a position said first and second distance away from said pin fitting hole, respectively.

4. The cassette case according to claim 2, wherein said means for providing independent rotational movement comprises a supporting pin having a first diameter and a cylindrical supporting pin having a hole in its center, both formed on one side plate of said inner box, a diameter of said hole being substantially equal to a diameter of said supporting pin, and said partitioning plate has a hole, a diameter of which is substantially equal to a diameter of an outer circumference of said cylindrical pin, so that said cylindrical pin is rotatably inserted into the hole of said partitioning plate and said supporting pin is rotatably inserted into the hole of said cylindrical pin.

5. A cassette for containing a plurality of cassettes comprising:

a cover box having a front surface plate and right and left side plates extending orthogonally from said front surface plate in a first direction;

an outer box having a back surface plate and a pair of side plates extending orthogonally from said back surface plate, and pivotably connected to said cover box for movement between a first, closed position, in which a box-type assembly is formed by said cover box and said outer box, and a second, opened position, in which said back surface plate is abutted on the front surface plate of said cover box;

a plurality of inner boxes having a front plate and left and right side plates extending orthogonally therefrom, and a bottom plate for forming receptacles each to accommodate a plurality of cassettes;

partitioning means extending substantially parallel to said side plates and from said back surface plate of said outer box for defining a number of spaces equal in number to said plurality of inner boxes; and means arranged between said side plates of said outer box, said partitioning means, and said plurality of inner boxes for providing independent rotational movement between each of said inner boxes relative to said outer box.

6. The case according to claim 5, wherein said means for providing independent rotational movement comprises a supporting pin having a first diameter and a cylindrical supporting pin having a hole in its center both formed on one of said side plates of each of said plurality of inner boxes, a diameter of said hole being substantially equal to a diameter of said supporting pin, and said partitioning means has a formed therein a hole, a diameter of which is substantially equal to a diameter of an outer circumference of said cylindrical pin, so that said cylindrical pin is rotatably inserted into the hole of said a partitioning means and said supporting pin is rotatably inserted into the hole of said cylindrical pin.

7. The case according to claim 5, wherein said means for providing rotational movement comprises an arcuate slot formed in each said side plate of said outer box, a center position of which corresponds to a position of said supporting pin formed on a side wall of each inner box, for guiding a rotation of itself relative to said outer box, wherein said first distance between said supporting pin and said arcuate slot of one of said pair of side plates is different from a distance between the same of the other side plates, said right side plate of said outer box has a pin fitting hole rotatably receiving the supporting pin of the right side plate of said inner box, and an arcuate slot located at a position said first distance away from said pin fitting hole, said left side plate of said outer box has a pin fitting hole rotatably receiving the supporting pin of the left side plate of said inner box, and an arcuate slot located at a position said second distance away from said pin fitting hole, and said partitioning means has a pin fitting hole rotatably receiving said supporting pin and first and second arcuate slots each located at a position said first and second distance away from said pin fitting hole, respectively.

* * * * *